Fig. 3.

INVENTOR
ROBERT HERBST

Fig. 4.

INVENTOR
ROBERT HERBST

R. HERBST.
ADDING MACHINE.
APPLICATION FILED AUG. 11, 1915.

1,293,094.

Patented Feb. 4, 1919.
6 SHEETS—SHEET 6.

INVENTOR
ROBERT HERBST
BY
ATTORNEYS

UNITED STATES PATENT OFFICE.

ROBERT HERBST, OF MOUNT VERNON, NEW YORK.

ADDING-MACHINE.

1,293,094.  Specification of Letters Patent.  Patented Feb. 4, 1919.

Application filed August 11, 1915. Serial No. 44,859.

*To all whom it may concern:*

Be it known that I, ROBERT HERBST, a citizen of the United States, and resident of Mount Vernon, county of Westchester, State of New York, have invented certain new and useful Improvements in Adding-Machines, of which the following is a specification.

My invention relates more particularly to adding machines of the chain index type in which endless chains are drawn manually over an index plate carrying numeral designations from 1 to 9 inclusive. This general type of machine is well known but so far as I am aware none of these machines carry numeral wheels adapted to indicate the individual numbers as they are added.

The object of my improvement is to provide this type of machine with indicator wheels adapted to indicate or show each number added when the chains are drawn down, the indicator wheels being adapted to be reset after each addition.

Another object of my invention is to provide an improved transfer mechanism for carrying the tens from lower to higher denominations. It has been found difficult to provide chain operated machines with a satisfactory transfer mechanism and for this reason it is believed that the mechanism I have devised is of considerable importance.

Another object of my invention is to provide machines of this type with a satisfactory recording device adapted to list the numbers as they are added and to take the total from the totalizer wheels when the addition is completed. This recording or printing mechanism is adapted to coöperate with the indicator wheels as to the listing mechanism and the handle which is adapted to restore the indicator wheels to zero after each number is added is adapted to list the number; likewise the handle which is adapted to reset the totalizer wheels to zero is adapted to take an impression of the total from type wheels connected with the totalizer wheels.

My invention further contemplates improvements in various details of the mechanism and includes ribbon mechanism for feeding the ribbon across the faces of the type wheel and paper feed mechanism for feeding a strip of paper upon which the numbers are listed. I have also embodied in my improved machine mechanism for eliminating useless zeros in the printing of the numbers listed and the total thereof.

My improvements are conveniently shown for the purpose of illustration in the accompanying drawings of which Fig. 2 is a side elevation of the right hand side of the machine; Fig. 5 is a rear view of part of the mechanism at the left side of the machine; Fig. 6 represents a cross section of one of the register or totalizer wheels; Figs. 7—7ª represent the sprocket wheels over which the several chains are adapted to run; Fig. 7 being a section along the line 7—7 of Fig. 7ª; Fig. 8 is a side view of the register wheel in section along the line 8—8 of Fig. 6; Fig. 9 represents a gear and spiral cam connected with the transfer mechanism; Fig. 10 is a detail of the pawl lifting device of the transfer mechanism; Fig. 11 shows sectional views of the transfer mechanism while Fig. 12 shows an assembly of the transfer mechanism in connection with a register wheel; Fig. 13 is a detail of the escapement of the transfer mechanism; Fig. 14 is a cross section of the numeral wheel shaft.

Referring to the drawings 1 represents the top plate of the machine which is preferably provided with a plurality of open slots 2 extending from near the top to near the bottom of the machine and through which the fingers of the operator are adapted to pass in operating the chains. Above and below these slots are narrow windows 3 and 4 for viewing the total shown on the totalizer wheels and the number just added as shown on the indicator wheels.

Figures 5, 6, 7, 7A, 8, 9, 10, 11, 12, 13, 14:
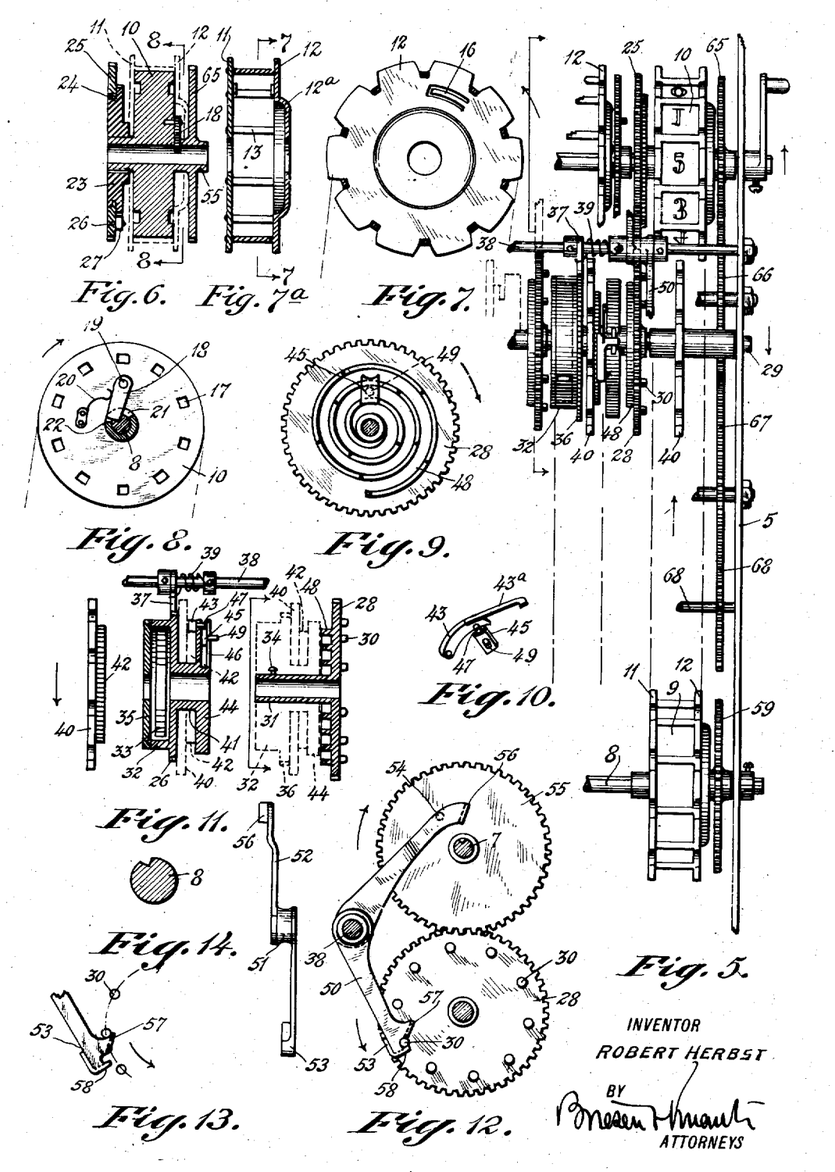

The frame of the machine is here shown as made up of two side plates 5 and 6 which are adapted to support the principal parts of the mechanism and to which the top plate 1 is secured in any suitable or preferred manner. Within the frame is mounted, on the shafts 7 and 8 respectively, a plurality of numeral wheels each provided with numerals from 0 to 9 inclusive, the lower set of numeral wheels 9 on the shaft 8 are the indicator wheels and the upper set 10 on the shaft 7 are the register or totalizer wheels. Each of these wheels is preferably mounted in a cage comprising a pair of sprocket members 11 and 12 connected by bars 13 which latter are adapted to space the sprocket members apart a sufficient distance to properly clear the respective numeral wheels 9 and 10 which are adapted to revolve freely therein. The spaces or openings between the bars 13 serve as windows for viewing the numerals on the dials or wheels 9 and 10. A corresponding plurality of endless chains 14 extend over the sprocket wheels each chain passing over the sprocket wheel of a totalizer wheel and of an indicator wheel substantially as indicated in the drawings. The chains 14 are adapted to be exposed through the slots 2 in the top plate and beneath the chains is mounted in the frame of the machine an index plate 15 which is graduated from the bottom upward from 1 to 9, the distance between the designating numerals corresponding with the distance between the cross-bars or links of the chain. It will thus be seen that when the operator desires to add a number the fingers are placed in the links of the chain over the index numerals corresponding to the number to be added and the chains drawn down to the limit of the slots 2. This operation will turn the sprocket wheels and the corresponding register wheels and indicator wheels. The latter operation is accomplished by providing the sprocket wheel members 11 and 12 (Figs. 7 and 7ª) with spring pawls or fingers 16 which are adapted to engage indentations or ratchet teeth 17 in the sides of the respective numeral wheels (Figs 6 and 8). This produces a ratchet connection between the sprocket wheels and the associated numeral wheels such that when the chain and sprocket wheel is moved in the forward direction both numeral wheels will be driven or turned in the same direction and moved a distance corresponding to the movement of the chain. It will, however, be apparent that by this construction the numeral wheels can be turned in a forward direction independently of the chains and sprocket wheels.

Each numeral wheel is preferably provided with a pawl 18 (see Figs. 6 and 8) pivoted at 19 and thrust inward through the hub of the wheel by a spring 20, the hubs of the respective wheels being slotted, as indicated at 21, for the entrance of the pawl 18 therethrough in order that it may engage a longitudinal groove or way in the corresponding shafts 7 and 8 substantially as indicated in Fig. 8. The object of this construction is to permit resetting the respective numeral wheels to zero by turning the wheels in a forward direction independently of the sprocket members and the chains, this being permitted by the ratchet connection 16—17 as hereinbefore explained.

The arrow in Fig. 8 indicates the direction of rotation of the numeral wheel 10. When numbers are being added the shaft 8 remains stationary and the pawl 18 is merely carried along by the numeral wheel and slides over the surface of the shaft 8. When it is desired to restore the numeral wheels to zero the shaft 8 is rotated in the same direction as the wheels are turned by the chains and the face of the longitudinal groove 22 will pick up the pawls 18 of the several wheels and carry them forward independently of the sprocket wheels and restore them to zero this being the limit of the forward motion of the shaft 8 or the corresponding shaft 7 as to the indicator wheels.

The sprocket member 12 of each of the sprocket wheels is provided with an extension or recessed portion 12ª as indicated in Figs. 6 and 7ª adapted to inclose the pawl 18 and spring 20 on the sides of the numeral wheels.

Figure 4:
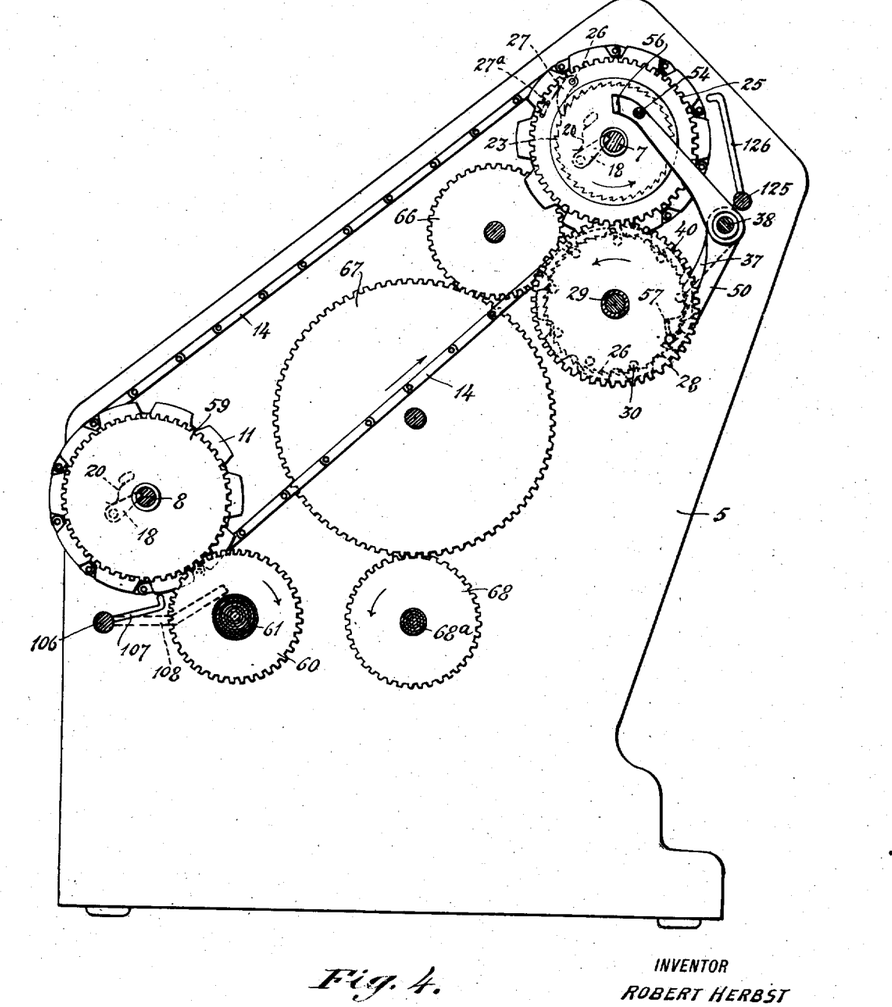
Fig. 4 is a vertical longitudinal cross section along the line 4—4 of Fig. 1.

The general construction of the parts thus far described with respect to the two sets of numeral wheels are substantially the same but it will be understood that in connection with the upper set or register wheels some form of transfer mechanism is required to transfer the tens from wheels of lower denomination to those of higher denomination. It is desirable that a device of this kind shall act automatically at the proper time and in my device it is preferable that it should act independently of the chains and sprocket wheels. For this purpose I have provided the register wheels 10 with hubs extending laterally to which, on each wheel, there is affixed a ratchet wheel 23 provided with ratchet teeth extending in a direction opposite to the direction of rotation of the wheel. Revolubly mounted upon a recessed bearing at 24 on the ratchet wheel 23 is an annular spur gear 25 the number of teeth thereon being some multiple of 10. The spur gear 25 has secured to its face at 26 (Figs. 4 and 6), a pawl 27 held by a spring 27ª to engage the ratchet teeth of the wheel 23. This ratchet connection permits the forward movement of the register wheel 10 while the spur wheel 25 remains stationary but enables a movement of the spur wheel 25 in a forward direction to turn the register wheel 10 and since any movement of the register wheel 10 in a forward direction other than by the sprocket wheels and chains is made independently of the latter, the carrying or transfer of the tens can thus be made independently of any forward movement of the chains or their associated sprocket wheels. The spur gear 25 is adapted to mesh constantly with a spur gear 28 mounted on a shaft 29 secured in the frame of the machine parallel to the shafts 7 and 8. The gear 28 is preferably provided with a plurality of tooth studs 30 equally spaced and preferably ten in number which are adapted to coöperate with an escapement mechanism hereinafter described. The gear 28 (Figs. 9 and 11) is provided with a long tubular hub 31 adapted to extend toward the right on the shaft 29 as viewed from the front of the machine. This hub has mounted thereon a spring barrel and ratchet member 32 (Fig. 11) which is provided with a coiled watch spring 33, one end of which is secured at 34 to the hub 31 of the gear 28, while the other end is secured to the barrel 32. A disk 35 is set in the spring barrel to hold the spring in place. The barrel, as stated, is secured to or integral with a ratchet wheel 36 adapted to coöperate with a pawl 37 mounted upon a rod 38 supported in the side frame members of the machine substantially as illustrated in Figs. 4, 5 and 11. A spring 39 coöperates with a pawl 37 to hold it in engagement with a ratchet 36. The ratchet teeth of the wheel 36 in the present instance extend from right to left and are adapted to prevent backward rotation of the spring barrel when the spring is wound up. The spring is adapted to be wound up by means of a sprocket wheel 40 revolubly mounted upon the hub 41 of the spring barrel 32. The sprocket teeth of this wheel are adapted to be engaged by the links of the chain 14 the underside of which passes thereover as indicated in Fig. 4. The sprocket wheel 40 has, secured to one side thereof, (see Fig. 11, to left) a ratchet wheel 42 the teeth of which are opposite in direction to the teeth of the ratchet wheel 36 and are adapted to coöperate with a pawl 43 pivotally secured to a circular disk 44 the latter being secured to the hub 41 of the spring barrel 32 as indicated in Fig. 11 of the drawings. A spring 43ª (Fig. 10) holds the pawl 43 down to engage the ratchet 42. From this arrangement it will be understood that as the chains 14 are drawn forward during the addition of numbers the sprocket wheel 40 will be turned toward the rear as seen in Fig. 4 and the springs 33 will be correspondingly wound up by means of the engagement of the pawl 43 with ratchet 42. The chain 14 which is adapted to wind up the spring 33 is coöperating with the register wheel to the right of the register wheel with which the corresponding spur gear escapement wheel 28 is in engagement. It will be observed that by permitting the escapement of the wheel 28 the spring 33 is unwound from the inside step by step as the carrying of the tens from lower to higher denomination is required. Since the carrying of the tens varies according to the size of the numbers added the number of units to be transferred from time to time will vary and hence the springs 33 may be required to carry or transfer the tens when the chains associated therewith, for some of the wheels at least, have not been operated. For this reason I preferably provide sufficient spring power to perform several successive carrying operations without the necessity of rewinding the springs. And since the rewinding of the springs occurs thus infrequently it may happen that the springs of some of the transfer mechanisms would become overwound and to avoid this I have provided means for releasing or disengaging the pawl 43 from the ratchet 42. This is accomplished by providing a sliding block 45 adapted to slide radially in a groove 46 in the disk 44 substantially as indicated in Fig. 11. The block 45 is adapted to contact with a pin 47 extending laterally from the pawl 43 so that the latter may be lifted out of engagement with the ratchet wheel 42 when the block 45 is farthest from the center of the disk 44. The position of the block 45 is adapted to be controlled by a spiral cam groove 48 secured to the adjacent face of the gear 28, the block being provided with a laterally projecting pin 49 adapted to engage in the cam groove 48. The spiral groove 48 extends in the winding direction of spring barrel 32 so that as the block 45 and its pin 49 are carried forward in winding the spring the block 45 will be gradually shifted radially as the pin 49 follows the spiral groove 48. It will thus be seen that when the spring has been wound to a certain predetermined extent the block 45 will be carried out far enough to contact with the pin 47 and lift the pawl 43 out of engagement with the ratchet 42 and thus prevent further winding of the spring until one or more transfers of the tens has occurred by the escapement and rotation of the wheel 28 and the associated register wheel of the adjoining higher denomination. As soon as the escapement of the wheel 28 takes place the spiral cam 48 will be carried around in the direction indicated by the arrow in Fig. 9, thus drawing the block 45 inward again and permit the pawl 43 under the action of the spring 43ª (Fig. 10) to reëngage the ratchet 42 which, being turned by the sprocket 40, will wind the spring as hereinbefore explained.

The escapement of the wheel 28 is controlled by an escapement rock lever 50 which preferably consists of two arms extending in substantially opposite directions and secured to a hub or spacing member 51 the upper arm 52 being adjacent a wheel of lower denomination while the escapement arm 53 is adjacent the escapement studs 30 on a gear 28 connected with the register wheel of higher denomination. A pin or stud 54 is suitably inserted in the side of a gear 65 which, as hereinafter explained, is suitably secured to the hub 55 of the register wheel 10. The pin 54 is adapted to coöperate with a turned-over lip or projection 56 on the upper lever arm 52 and rock the escapement lever once during each rotation of the register wheel. The lower arm 53 is provided with laterally projecting flanges or lips 57 and 58 which are adapted to coöperate with the pins 30 of the escapement wheel or gear 28. It will be seen in Fig. 12 that one of the pins 30 is adapted to rest upon the flange or lip 58 at the lower end of the escapement arm 53 and prevent the rotation of the wheel 28 under the impulse of its spring 33. When, however, the register wheel of lower denomination is turned more than a complete revolution the pin 54 connected therewith will strike the lip 56 and, passing thereover, will rock the lever 50 thus withdrawing the lip 58 from in front of the pin 30 so as to allow the spring 33 to turn the escapement wheel 28. The escapement wheel 28 will be permitted to turn one-tenth of a complete revolution to carry the tens when it will be again held by the succeeding pin 30 engaging the lip 58. This is caused to occur by the succeeding pin 30 under the impulse of the spring 33, engaging the bevel or cam lip extension 57 on the lever above the lip 58 and camming the lever 50 back into normal position where the pin which has operated the cam will engage the lip 58 substantially as illustrated in Figs. 12 and 13 of the drawings. The escapement of the wheel 28 to carry the tens will occur as often as the register wheel of lower denomination completes a revolution, independent of whether the register wheel is rotated by the chain associated therewith or by the carrying mechanism of the lower denomination. In all cases it will be observed that the chains wind up the springs 33 a sufficient amount to carry the tens a plurality of times thus insuring proper operation of the carrying device whether or not the register wheels and chains of higher denomination have been operated in the addition of numbers.

In this connection it will be stated that it may be desirable to operate the chains by drawing them all down two or three or more times at the beginning of the day, or when it is though that any of the carrying springs are likely to become exhausted during normal use of the machine.

Figure 1:
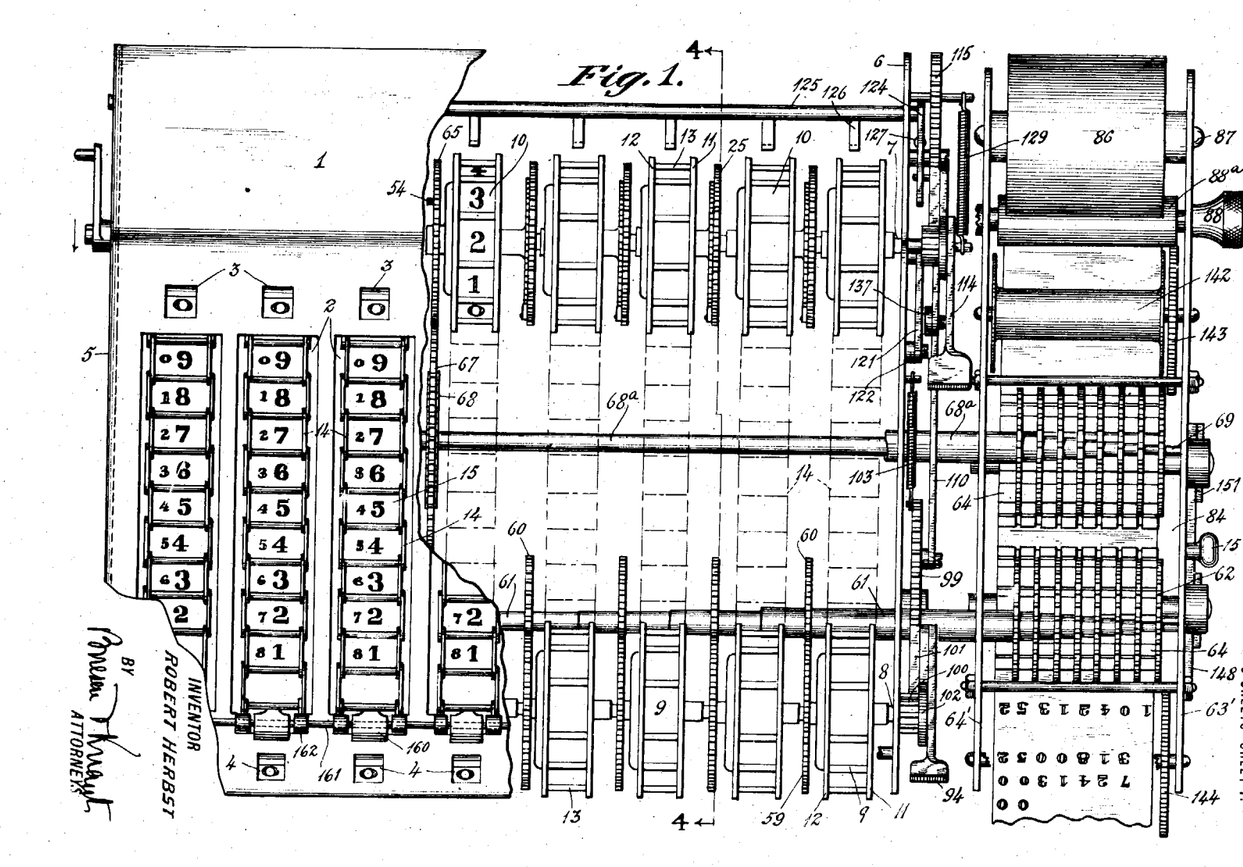
Figure 1 represents a plan view, partially in section, some of the parts being lifted off to more clearly show certain details.

I have found it desirable to embody in my improvement a printing or listing mechanism whereby the successive numbers added and totalized on the adding machine may be recorded upon a strip of paper and later the total printed thereunder. The listing arrangement for the individual numbers added is connected with the indicator wheels 9, each wheel or dial being secured to a gear wheel 59 which in turn is in mesh with a gear wheel 60 secured to a tubular shaft 61 the opposite end of which is provided with a similar gear 62 adapted to mesh with a gear 63 secured to a type wheel 64. The several gears 60 and tubular shafts 61 are telescoped and pivotally supported in the frame of the machine said tubes all extending toward the right through the side plate 6 and preferably into a separate compartment formed by securing together two frame plates 63' and 64' which are in turn rigidly secured to the main side plate 6 of the machine substantially as indicated in the drawings. The gear 60 nearest the side plate 6 is connected with the outer tubular shaft 61 of the telescoping series and with the corresponding gear wheel 62 to the left of the series between the frame member 63' and 64' and so on through the series. Thus it will be seen that the units numeral wheel will be connected with the type wheel to the left of the series as seen from the front of the machine, hence it will be necessary to have the types on the respective wheels reversed so that the printing will be up side down as viewed from the front of the machine substantially as illustrated in Fig. 1 of the drawings.

Figure 19:
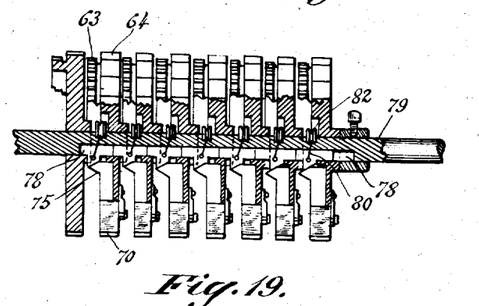
Fig. 19 shows one set of the type wheels partially in section.
Figures 20, 21:
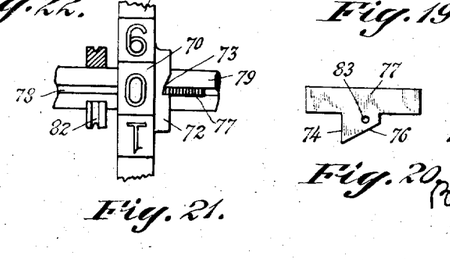
Figs. 20, 21 and 22 are details of a type wheel zero mechanism and Fig. 23 (Sheet 2) is a separate view of the chain lock pawl.
Figure 22:
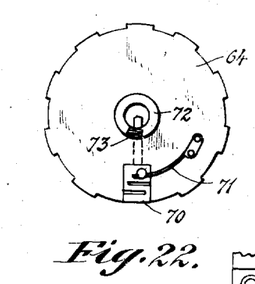

Each of the register wheels 10 is likewise secured to a gear 65 which through intermediate gears 66, 67 and 68 is connected with a similar series of telescoping shafts 68ª which are connected respectively to gears 69 which mesh with corresponding gears 63 of the type wheels 64 adapted to print the totals registered on the totalizers. The two series of type wheels are substantially identical in construction and the parts thereof will be referred to by the same designating numerals. Each type wheel 64 is provided with a plurality of type, preferably ten, radially disposed and adapted to be brought into register at the lower side of the machine for taking an impression therefrom. The zero type is preferably movable inward by being mounted on a separate block 70 which is held below the level of the other types or above the printing level by a spring 71 secured to the type wheels substantially as indicated in Figs. 19 and 22. The object of this arrangement of the zero type is to prevent the useless zeros to the left of any number from being printed on the strip of paper. It is desirable, however, that any zeros to the right of any numeral should be printed and to accomplish this, each type wheel at 72 is provided with a hub flange extending toward the right as seen in Figs. 19 and 21 and has adjacent the zero type a notch 73 in which the slide member 74 is adapted to rest when the type wheel is at zero. Each zero type as previously stated is movable radially and is provided with an inwardly extending cam arm 75 adapted to coöperate with a bevel face 76 on the lug 74 of the small slide, the base 77 of which is elongated and adapted to slide in a keyway 78 in the shaft 79, the latter being rigidly secured in the printing frame members 63' and 64'. The slides 74 are each provided with a spring 80 tending to hold them toward the left as seen in Fig. 19 of the drawings. The spring 80 is preferably secured to an annular groove member 82 secured to the shaft 79 and the free end of the spring passes through a hole 83 in the corresponding slide 74. From this arrangement it will be understood that when a type wheel 64 to the left as seen in Fig. 19 is turned beyond the zero position the notch or cam face 73 will push the slide 74 toward the right and the bevel face 76 thereof will contact with the upper bevel of cam arm 75 on the type block 70 and thrust the zero type of the adjacent wheel downward into the printing plane. It will be observed that the bases 77 of the slides 74 are of sufficient length to contact with each other so that when any one of the slide members 74 is moved toward the right all those to the right thereof will also be moved to the right so as to throw the zero type into operative position as may be required.

The type wheels 64 are preferably mounted near a plate 84 (Fig. 2) secured in a horizontal position between the frame members 63' and 64' and adapted to act as a guide and support for a strip of paper 85 carried on a reel 86 revolubly mounted on a shaft 87 in the rear end of the frame 63' and 64' of the printing attachment. The paper strip may be fed forward step by step by any suitable mechanism and I have shown a feed roller at 88 for this purpose. A ratchet wheel 89 is connected with the inner end of the shaft of the roller 88 and is adapted to turn the same step by step as hereinafter explained.

Figure 15:
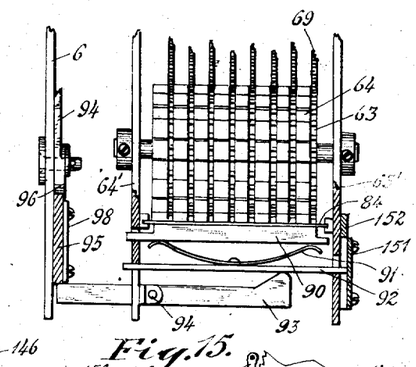
Fig. 15 represents one set of the type wheels and printing hammer and associated parts.

The types representing the number on the indicator wheels and likewise the total on the register wheels are brought to the lower side and means, substantially the same for both series of type wheels, is provided for taking an impression of the type on the strip of paper. For this purpose hammers or impression members 90 are mounted between the frames 63' and 64' as indicated in Fig. 15 of the drawings and adapted to press the paper and the interposed ink ribbon against the type wheels so that an impression may be taken therefrom. An intermediate spring 91 is preferably secured to a plate or bar 92 which is adapted to be pushed upward by a hammer or lever 93 pivoted at 94 to the inner frame member 64'. These lever members 93 are adapted to be operated by suitable connections with the respective handles. Two sets of hammers or impression devices, substantially similar in construction, are employed, one for the listing type wheels, controlled by the indicator wheels and one for the total type wheels controlled by the totalizer wheels.

Figures 2, 23:
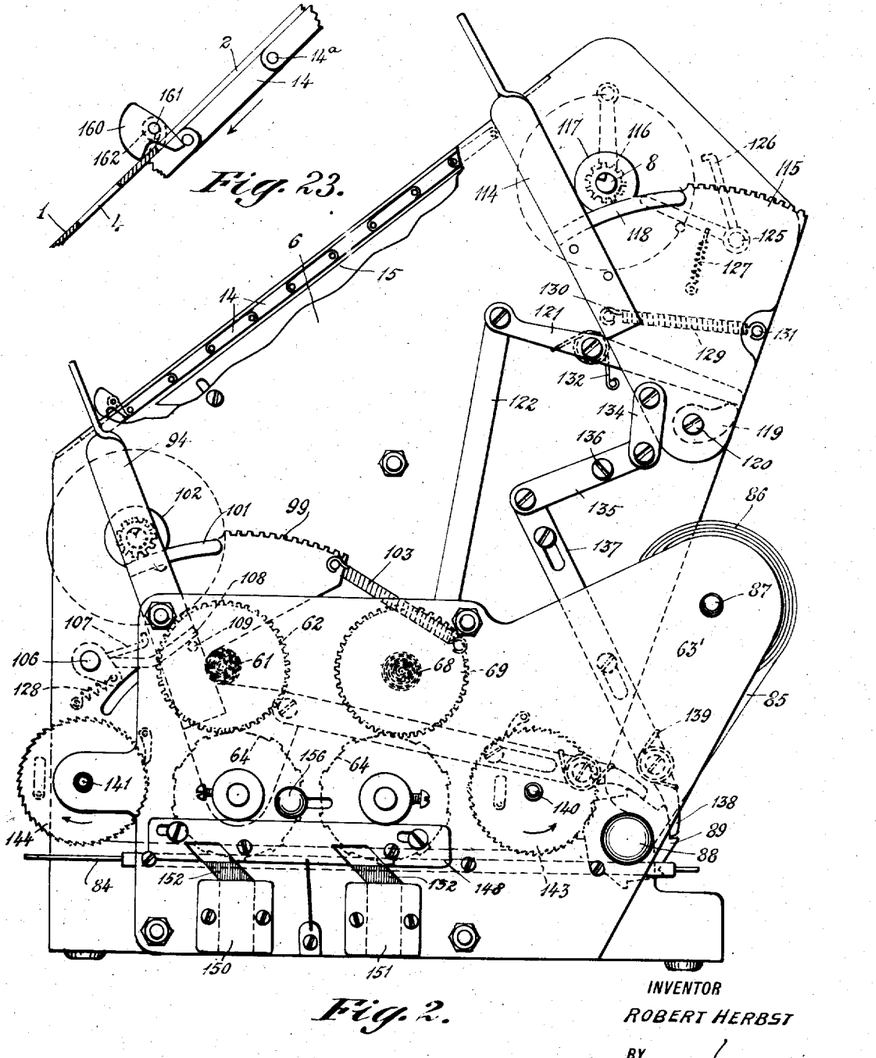
Figure 3:
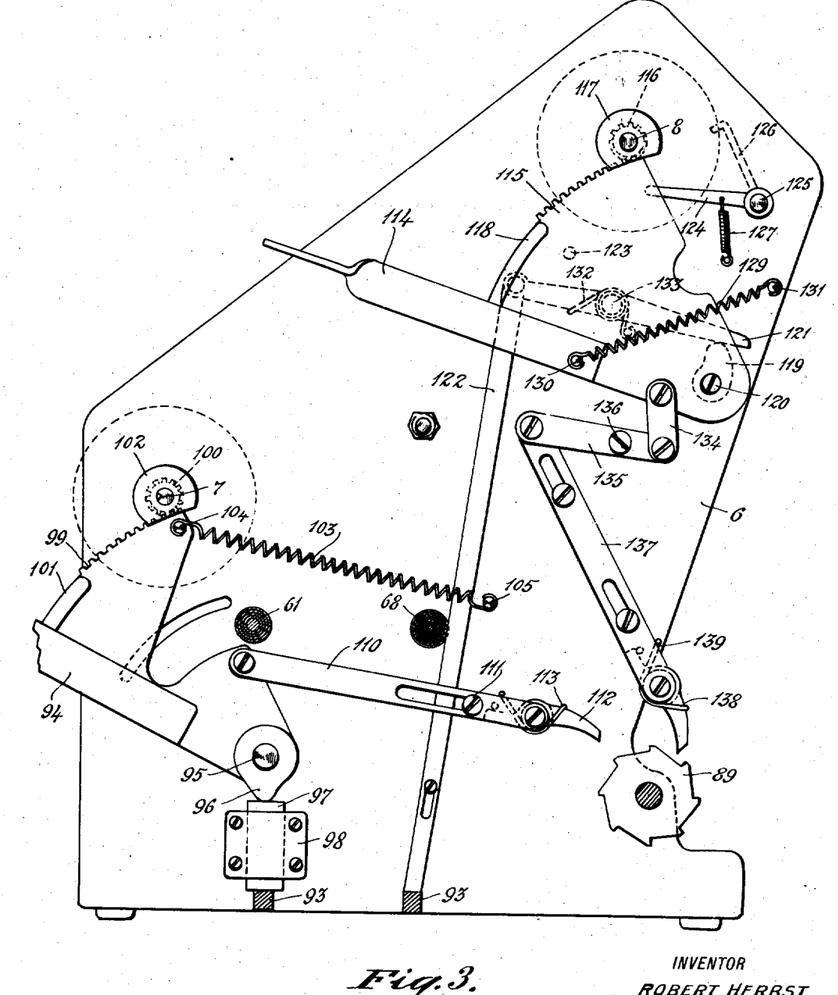
Fig. 3 is a side elevation of the machine with printing mechanism removed.

It has been previously explained that the indicator wheels are adapted to be restored to zero after each addition and it is intended that an impression of a number shown on the indicator wheels will be taken from the corresponding type wheels before the wheels are restored to zero. This is accomplished by the handle lever 94 pivoted at 95 (see Fig. 3) which has a cam 96 adapted to contact with a slide 97 held against the end plate 6 by a bracket 98, the slide 97 being adapted to contact with the inner end of the hammer or impression lever 93 associated with the forward or listing set of type wheels connected with the indicator wheels 9, as hereinbefore explained. The lever arm 94 is provided with a segment 99 adapted to mesh with a pinion 100 secured to the end of the shaft 7 so as to rotate the same one complete revolution. The arm 94 is also provided with a flat portion 101 adapted to coöperate with a Geneva disk 102 on the end of the shaft 7 so as to limit the rotation of the shaft and lock it in normal position. When the arm 94 is drawn forward it will first unlock the Geneva stop and then rotate the shaft 7, the lower cam 96 simultaneously pushing down the slide 97 and operating the lever 93 to make an impression of the type on the type wheels controlled by the indicator wheels. Then the lever 94 is released and it is drawn back by a spring 103 secured thereto at 104 and to the frame 6 at 105. In returning to normal position the segment 99 and pinion 100 will turn the shaft 7 in the opposite direction whereby the latter, by means of the groove therein coöperating with the pawls 18 of the numeral wheels, will restore the same to zero position. This movement of the numeral wheels or indicator wheels is accomplished without a corresponding movement of the chains or sprocket wheels associated therewith. This is permitted by the ratchet connection between the sprocket wheels and the corresponding numeral wheels as hereinbefore described. Preferably I mount in the frame a rock shaft 106 carrying a plurality of fingers 107 each adapted to coöperate with one of the chains to prevent movement of the same while the indicator wheels are being restored to zero. A cam arm 108 is preferably connected with the rock shaft 106 and adapted to coöperate with a pin 109 carried by the lever 94 so that each time the lever 94 is operated to print the number and restore the indicator wheels to zero the rock shaft 106 is operated to lock the chains by means of the fingers 107. The same lever 94 is preferably provided with a rearwardly extending link 110 slidably supported upon a screw 111 as indicated in Figs. 2 and 3 of the drawings, said link 110 carrying at its rear end a pawl 112 adapted to coöperate with the line space wheel 89 connected with the paper feed roll 88, previously described. Thus when the handle 94 is operated as above described the paper strip will be fed forward one line space by means of the pawl 112. The pawl is held in operative position by means of a spring 113 and may ratchet over the teeth upon its return to normal.

For restoring the register wheels to zero and printing the totals shown thereon a similar handle 114 is provided, having a rack segment 115 adapted to mesh with a pinion 116 on the end of the shaft 8. The shaft 8 is also provided with a Geneva disk 117 adapted to coöperate with a flat portion 118 on the arm or segment substantially as shown in Figs. 2 and 3 of the drawings. A cam 119 is likewise provided near the pivot 120 and is adapted to coöperate with a lever 121 carrying at its opposite end a link 122 adapted to slide up and down and coöperate with the other printing arm 93 to print the total represented on the totalizer and on the associated type wheels. The lever 114 or segment 115 is preferably provided with a pin 123 adapted to coöperate with a cam lever 124 secured to a rock shaft 125 mounted in the frame of the machine and carrying a plurality of fingers 126 adapted to lock the chains while the register wheels are being restored to zero by turning the shaft 8 in the manner hereinbefore described as to shaft 7. Suitable springs 127 and 128 are provided to keep the fingers 126 and 107 respectively out of operative engagement with the chains. A spring 129 is provided for restoring the lever 114 to normal position said spring being connected at 130 with the lever and at 131 with the frame 6 of the machine. A spring 132 around the pivot 133 of the lever 121 is adapted to keep the rear end of this lever in contact with the cam 119.

It will be understood that various modifications in the method and mechanism of operating the shafts 7 and 8 to restore the respective numeral wheels to zero and for taking an impression of the types may be made and the particular devices and mechanism herewith shown is merely one example of how it may be done. The lever 114 is also provided with means for line spacing the strip of paper which in the present instance consists of a link 134 connected to a lever 135' pivoted at 136 to the frame plate 6 of the machine. The forward end of the lever 135 carries a sliding link 137 provided with a pawl 138 adapted to coöperate with the line space wheel 89 connected with the paper feeding roller 88. A spring 139 is adapted to keep the pawl 138 in normal position. The printing and zero returning devices for the listing and for the total levers are shown as substantially the same.

Figures 16, 17, 18:
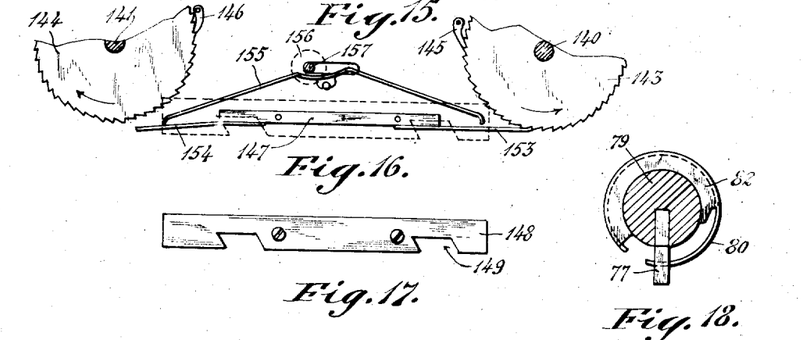
Fig. 16 is a detail of the ribbon feed mechanism.
Fig. 17 shows the cam slide of the ribbon feed mechanism.
Fig. 18 shows a detail of the type wheel zero devices.

The impression of the type is taken on a strip of paper through a ribbon extending from front to back under both sets of type wheels the ribbon reels being revolubly mounted upon rods 140 and 141 as indicated in Figs. 2 and 16. The reels 142 are preferably frictionally connected with driving ratchets 143 and 144 one adapted to be driven toward the right and the other toward the left to feed the ribbon in one or another direction. Suitable pawls 145 and 146 are pivotally secured to the frame plate 63' of the machine and adapted to prevent backward rotation of the respective ribbon feeding ratchets. A ribbon feeding pawl is mounted at each end of a reciprocating block 147 which is slidably mounted on the frame plate 63' and is connected with a cam plate 148 on the outside of the frame plate 63' substantially as indicated in Figs. 15 to 17 inclusive. The cam plate 148 is provided with two cam notches 149 each of which is adapted to coöperate with reciprocating cam slide blocks 150 and 151, said slide blocks being adapted to be reciprocated up and down by the respective hammers 93 during the impression taking operation when the numbers are listed or the total is taken. Each time this occurs the slide block 150 for the indicator wheels or 151 for the totalizer wheels is reciprocated upwardly and the upper end 152 thereof is adapted to coöperate with the corresponding cam notch 149 and reciprocate the ribbon feed pawl 153 to turn the right hand ratchet 143, as indicated in Fig. 16 of the drawing or the pawl 154 to turn the left hand ratchet. The spring pawls 153 and 154 are adapted to alternately engage their respective ratchet wheels 143 and 144, but only one can be in feeding position at a time. This is accomplished by the rocking member 155 which is adapted to rock and press down one or the other of the pawls 153 or 154 and hold it out of the field of the associated ratchet. The feed is reversed by rocking the member 155 by means of a knob 156, the stud 157 of which is adapted to coöperate with the member 155.

The manually operated chains 14 which are operated for the addition of members are apt to overthrow when operated rapidly and to prevent this I preferably mount in the lower end of each of the openings 2 a pawl 160 pivoted on a rod 161, suitably supported on the top plate 1, as by tongues 162 bent up of the material of the top plate and rolled about the rod 161 as shown in Figs. 1, 2 and 23. The lower ends of the pawls 160 are adapted to extend into the path of cross bars or link pivots 14$^a$ of the chains 14, the latter being adapted to slide under the pawl 160 until the upper end thereof is struck by the fingers drawing down the chains. When this occurs the ends of the pawls 160 stop and hold the chains from further advance or overthrow.

It will be understood that I do not wish to be limited to the specific details of construction shown for obviously various modifications and adaptations can be made without departing from the spirit and scope of my invention.

I claim:

1. In an adding machine the combination with a register wheel and an indicator wheel, of an endless chain for driving said wheels in one direction, shafts for carrying said wheels and means coacting with said carrying shafts for turning said wheels, independently of said chain, to restore the same to zero.

2. In an adding machine the combination with a register wheel and an indicator wheel spaced apart and mounted on parallel shafts having longitudinal grooves, of an endless chain for simultaneously turning said indicator wheel and the register wheel in one direction during the addition of numbers, and means coacting with said grooves for turning the respective wheels independently of said chain to restore the same to zero.

3. In an adding machine the combination with register wheels and indicator wheels, means for carrying said wheels of endless chains, each adapted for turning one each of said wheels in one direction to add numbers and means coacting with said carrying means for resetting the indicator wheels to zero after the addition of each number without moving said chains or register wheels.

4. In an adding machine the combination with a register wheel and an indicator wheel, of a pair of parallel shafts upon which the respective wheels are revolubly mounted, sprocket wheels mounted in coöperative relation with said register wheels and indicator wheels respectively, pawl and ratchet connections therebetween and endless chains over said sprocket wheels for turning said wheels.

5. In an adding machine the combination with a register wheel and an indicator wheel, of sprocket wheels in coöperative relation with said register and indicator wheels respectively, an endless chain over said sprockets and ratchet and pawl connections between said sprocket wheels and the respective register and indicator wheels whereby the latter may be simultaneously revolved by means of said chain.

6. In an adding machine the combination of register wheels, a shaft therefor, indicator wheels, a shaft therefor, said shafts being parallel and spaced apart, sprocket wheels associated with said register and indicator wheels respectively, an endless chain over said sprockets, ratchet drive connections between the respective sprockets and the associated wheels whereby moving the chain will simultaneously turn both said register wheel and said indicator wheel in adding numbers, and means for rotating said shafts individually for restoring the respective wheels to zero without movement of the chains.

7. In an adding machine the combination of indicator dials, a shaft upon which they are revolubly mounted, sprocket wheels coaxially mounted with said dials, chains carried by said sprocket wheels for turning said sprocket wheels in adding numbers, ratchet connections between said sprocket wheels and the respective dials whereby the dials are turned in proportion to the movement of the respective chains to indicate the digits of the numbers added and means for turning said dials forward to restore them to zero without moving said chains.

8. In an adding machine the combination of numeral dials, a shaft upon which said dials are revolubly mounted, coöperative means between the shaft and the respective dials for alining the latter at zero, sprocket wheels carried on said shaft and chains for turning said dials while adding numbers and means for turning said shaft to restore said dials to zero independently of said chains.

9. In an adding machine the combination of numeral dials, a shaft upon which said dials are revolubly mounted, sprocket wheels carried on said shaft and chains movable to add numbers, ratchet and pawl connections between the sprocket wheels and the respective dials whereby the latter are turned by forward movement of said chains, means for turning said dials to restore them to zero independently of said sprockets and chains and means for locking said chains against forward movement when restoring said dials to zero.

10. In an adding machine the combination of numeral dials, means to support said dials, sprocket wheels carried by said supporting means, and chains for revolving said dials in one direction, means for turning said dials in a forward direction to restore them to zero and means operable during the operation of the last named means for preventing forward movement of said sprockets and chains, whereby said dials are movable independently of said chains.

11. In an adding machine the combination with a casing, two parallel shafts supported therein, a numeral index plate between said shafts, a plurality of numeral wheels on each of said shafts, sprocket wheels associated with each of said numeral wheels, endless chains around said sprockets and over said index plate, each chain being adapted to turn one numeral wheel on each of said shafts, coöperating means between said numeral wheels and the respective shafts whereby by turning the latter the numeral wheels may be turned to zero independently of said chains and means for turning said shafts.

12. In an adding machine the combination with register wheels and chains for manually turning the same, of an index plate for selectively predetermining the movement of said chains for adding numbers and stop pawls for stopping the forward or downward movement of the respective chains when the same have moved the required distance, said pawls being operated by the finger.

13. In an adding machine the combination with register wheels and indicator wheels of endless chains for manually turning said wheels, an index plate over which said chains are adapted to be drawn in accordance with numbers to be added and a manually operable stop coöperating with each chain to stop the same when it has been drawn across the index plate a distance corresponding with the numeral to be added.

14. In an adding machine the combination with register wheels and endless chains for turning the same, of transfer wheels adapted to turn said register wheels independently of said chains to carry the tens.

15. In an adding machine the combination with register wheels and endless chains for turning the same, of transfer wheels, springs for actuating the latter and means for releasing said wheels to carry the tens, said transfer wheels being adapted to turn the register wheels independently of said chains.

16. In an adding machine the combination with register wheels, of transfer wheels associated therewith adapted to carry the tens, individual springs for said transfer wheels for turning the same and the associated register wheels, escapement mechanism for releasing each transfer wheel when carrying is to be done and means operable during the addition of numbers for winding said springs.

17. In an adding machine the combination with register wheels and endless chains for turning the same, of transfer wheels adapted to carry the tens, ratchet and pawl connections between the transfer wheels and the associated register wheels, thereby permitting the latter to be turned while the former remain stationary, springs for turning said transfer wheels to carry the tens, said springs being adapted to be wound up by said chains during the addition of numbers and an escapement for each transfer wheel operable by the adjacent register wheel of lower denomination.

18. In an adding machine the combination with register wheels and endless chains for turning the same, of transfer wheels adapted to carry the tens, ratchet connections between said register wheels and the respective transfer wheels, individual springs for turning said transfer wheels and the associated register wheels in carrying the tens, means operable by the chains during addition for winding said springs, said ratchet connections permitting such winding without movement of the respective transfer wheels, a plurality of equally spaced stud teeth on each transfer wheel and an escapement coöperating with said stud teeth of each wheel to release the same intermittently, tooth by tooth, to carry the tens.

19. In an adding machine the combination with register wheels and endless chains for turning the same, of transfer wheels adapted to carry the tens, ratchet connections between said register wheels and the respective transfer wheels, individual springs for turning said transfer wheels and the associated register wheels in carrying the tens, means operable by the chains during addition for winding said springs, automatic means for preventing overwinding of said springs, said ratchet connections permitting such winding without movement of the respective transfer wheels, a plurality of equally spaced stud teeth on each transfer wheel and an escapement coöperating with said stud teeth of each wheel to release the same intermittently, tooth by tooth, to carry the tens.

20. In an adding machine the combination with register wheels and endless chains for turning the same, of transfer wheels adapted to turn said register wheels independently of said chains, springs for turning the respective transfer wheels, escapement mechanism for each transfer wheel for releasing the same to carry the tens, said escapement being adapted to be operated by register wheels of lower denomination, and means operated by said chains during the addition of numbers for winding said springs.

21. In an adding machine the combination of register wheels, endless chains and sprocket wheels for turning the same, ratchet connections between the sprocket wheels and said register wheels, thereby permitting the latter to be turned independently of said chains, transfer wheels for turning the respective register wheels for carrying the tens, a spring for each transfer wheel, means for winding the springs during the addition of numbers and means for preventing overwinding of said springs.

22. In an adding machine the combination of register wheels, endless chains for turning said wheels for adding numbers, transfer wheels adapted to turn said register wheels independently of said chains to carry the tens, barrel springs for turning said transfer wheels, stationary pawls to hold the respective springs against unwinding, a plurality of stud teeth on each of said transfer wheels, escapement levers coöperating with the stud teeth of the respective wheels and a coöperating stud on each of said register wheels adapted to rock the corresponding escapement lever of higher denomination, whereby carry of the tens is effected, each transfer wheel and spring being adapted to effect a plurality of carrying operations without rewinding the spring.

23. In an adding machine the combination of register wheels, endless chains for turning the same, transfer wheels, barrel springs for turning said transfer wheels and the corresponding register wheels in carrying the tens, sprocket wheels adapted to be turned by the respective chains for winding said springs as numbers are added, ratchet and pawl connections between said sprocket wheels and the corresponding spring barrels to connect the two while winding said spring and means adapted to lift said pawl out of the ratchet when said spring is wound up a predetermined amount.

24. In an adding machine the combination with numeral wheels, shafts supporting said wheels and having longitudinal grooves, and means for turning the same, of type wheels geared to said numeral wheels, means for taking an impression from said type wheels, means coacting with said grooves for restoring the numeral wheels and the type wheels to zero and manually operated means for taking said impression and thereafter restoring said wheels to zero.

25. In an adding machine the combination with numeral wheels and means for turning the same, of type wheels geared to said numeral wheels to turn in unison therewith, means for preventing the printing of useless zeros, means for taking an impression from the type wheels of numbers indicated on said numeral wheels, a handle for taking said impression and for restoring said numeral and type wheels to zero, ribbon mechanism and paper feed mechanism coöperating with said impression means and adapted to be operated by said handle.

26. In an adding machine the combination with numeral wheels and chains for turning the same, of type wheels geared to said numeral wheels to turn in unison therewith, means for restoring said numeral wheels and the associated type wheels to zero, means for locking said chains against movement when restoring said wheels to zero, a handle for taking an impression of numbers from said type wheels, said handle being adapted to operate said zero restoring means and said chain locking means.

In testimony whereof I have hereunto set my hand.

ROBERT HERBST.